(12) United States Patent
Kudlock

(10) Patent No.: US 10,827,722 B1
(45) Date of Patent: Nov. 10, 2020

(54) LIVESTOCK LOADING CHUTE

(71) Applicant: Terry Kudlock, Belle Fourche, SD (US)

(72) Inventor: Terry Kudlock, Belle Fourche, SD (US)

( * ) Notice: Subject to any disclaimer, the term of this patent is extended or adjusted under 35 U.S.C. 154(b) by 0 days.

(21) Appl. No.: 16/693,995

(22) Filed: Nov. 25, 2019

(51) Int. Cl.
*A01K 1/00* (2006.01)
*B60P 1/43* (2006.01)
*B60P 3/04* (2006.01)

(52) U.S. Cl.
CPC ............ *A01K 1/0035* (2013.01); *B60P 1/433* (2013.01); *B60P 3/04* (2013.01)

(58) Field of Classification Search
CPC ...... A01K 1/0035; A01K 1/0613; A01K 1/08; B60P 3/04; B60P 1/433; B60P 1/435
USPC .......................................... 119/843, 846–848
See application file for complete search history.

(56) References Cited

U.S. PATENT DOCUMENTS

| | | | | |
|---|---|---|---|---|
| 1,297,696 A * | 3/1919 | Krahmer | ................ | A01K 1/035 119/847 |
| 2,869,513 A * | 1/1959 | Luckett | ..................... | B60P 1/43 119/849 |
| 3,020,882 A * | 2/1962 | Browning | ............ | A01K 1/0613 119/848 |
| 3,148,664 A | 9/1964 | Nelson et al. | | |
| 3,225,744 A * | 12/1965 | Procter | ..................... | B60P 1/36 119/846 |
| 3,241,527 A * | 3/1966 | Burns | ....................... | B60P 1/43 119/848 |
| 3,538,889 A * | 11/1970 | Lu Verne | .................. | B60P 1/04 119/848 |
| 4,034,716 A * | 7/1977 | Fleming | ................. | A01K 29/00 119/847 |
| 4,201,157 A * | 5/1980 | Lambert | ............. | A01K 1/0613 119/512 |
| 4,321,889 A | 3/1982 | Michaelsen et al. | | |
| 5,669,332 A * | 9/1997 | Riley | ................... | A01K 1/0613 119/724 |
| 7,152,726 B2 | 12/2006 | Stotts | | |
| 2016/0304021 A1* | 10/2016 | Reinert | .................. | B60P 1/483 |

OTHER PUBLICATIONS 600-700 Series Parallel Squeeze Bale Bed by Deweze. Product Listing [online]. 2018 © DewEze [retrieved on Jun. 12, 2019]. Retrieved from the Internet: <URL: https://www.deweze.com/bale-beds/parallel-squeeze-600-700/>.

\* cited by examiner

*Primary Examiner* — Magdalena Topolski
*Assistant Examiner* — Arfan Y. Sinaki
(74) *Attorney, Agent, or Firm* — Cramer Patent & Design, PLLC; Aaron R. Cramer

(57) ABSTRACT

A livestock loading chute includes an angled open first end and an angled open second end. On opposite sides of the chute are a pair of loading connectors which permit the chute to be removably loaded upon the bed of a truck. A pair of vertical legs may be secured beneath the second end.

13 Claims, 5 Drawing Sheets

LIVESTOCK LOADING CHUTE

RELATED APPLICATIONS

None.

FIELD OF THE INVENTION

The present invention relates generally to a livestock loading chute.

BACKGROUND OF THE INVENTION

Livestock, such as cattle, sheep, goats, pigs and the like often require transport from one location to another. This is most often accomplished by putting them on and off of trucks via a chute. These chutes are heavy structures, not only to support the weight of hundreds or even thousands of pounds, but also must include structural sides to prevent the animals from leaping off before they reach the top or bottom. As such, these chutes are somewhat difficult to transport from place to place and must often be winched on and off of trucks. Such actions are not only difficult but may require the assistance of other workers. This is not only a labor intensive and costly process but represents a safety risk and is often just simply impossible for those who may be working by themselves. Accordingly, there exists a need for a means by which livestock loading chutes can be moved from one location to another without the difficulties as described above. The development of the livestock loading chute deployable by bale bed truck fulfills this need.

SUMMARY OF THE INVENTION

In view of the foregoing disadvantages inherent in the prior art, it has been observed that there is need for a livestock loading chute which comprises a base frame forming a walking surface for a plurality of livestock. The base frame is supported on a lower elevation by a plurality of bearing plates each of which are attached to the base frame. The livestock loading chute also comprises a pair of lower side frames each of which are mechanically connected to the base frame, a pair of panels each of which are attached to an inside surface of the pair of lower side frames to prevent the livestock from exiting the livestock loading chute through the lower side frames and a pair of upper side frames each of which are provided atop the lower side frames. The pair of upper side frames are provided without the pair of panels to allow for viewing of the livestock as they pass through the livestock loading chute.

The livestock loading chute also comprises a pair of sleeves which accept an adjustment mechanism from a bale bed loading mechanism on a truck to allow for movement of the livestock loading chute. The sleeves are mounted on an adjustment bar and are restrained by a pair of restraining brackets and locked in position by a pair of first locking pins. The livestock loading chute also comprises a load bearing walking surface which is provided atop the base frame, a pair of cross members which connect the upper portion of the upper side frames to provide structural stability for the livestock loading chute, a bale bed assembly which is mounted to the truck and a pair of posts which fully retract into a pair of locking slide collars, with a plurality of base plates resting upon a bed surface of the bale bed assembly and the bearing plates are at the same horizontal plane of the bed surface of the bale bed assembly.

The livestock loading chute may provide access from the lower elevation to an upper elevation. The lower elevation may be a grade while the upper elevation may be a transport trailer. The upper elevation may be the truck. The livestock loading chute may be supported at the upper elevation by the pair of posts, each equipped with the base plates. The base plates may be restrained by one of the pair of locking slide collars, which uses the adjustment mechanism to allow for the pair of posts to adjust and lock at different heights along a first travel path to allow for height adjustment of the upper elevation.

The adjustment mechanism may be a fastener selected from the group consisting of a bolt, a pin, a cotter pin, or a spring pin. The pair of panels may be made of galvanized sheet steel. The adjustment bar may allow for movement of the sleeves along a second travel path to compensate for a plurality of different sized trucks, a plurality of different grades, and one or more other external factors. The base frame, the lower side frames, the upper side frames, the bearing plates, the pair of posts, the base plates, the pair of locking slide collars, the pair of sleeves, the adjustment bar, the pair of restraining brackets, and the pair of first locking pins may be made of material selected from the group consisting of carbon steel stock shapes that are cut to size and welded together, aluminum, stainless steel, or steel.

The pair of sleeves may extend outward from the upper side frames in an inline arrangement. While the load bearing walking surface may be an assembly of wooden planks. The livestock loading chute may further comprise a plurality of traction aids which are provided atop the load bearing walking surface. The traction aids may be a plurality of aids which are selected from the group consisting of a plurality of wooden cleats, a plurality of metal bars, or a grid. The traction aids may be removed by removal of a pair of second locking pins and pulling the traction aids outward along a removal travel path. The truck may pull forward along a fourth travel path until the swing arms are fully rearwardly pivoted or extended and the truck pulls backward along the fourth travel path until the swing arms are fully rearwardly pivoted or extended.

The pair of sleeves may each be engaged by a pin head. The bale bed assembly, the swing arms on the bale bed assembly may be pivoted about a third travel path while the pin heads remain engaged with the pair of sleeves along the third travel path until the bearing plates contact a respective grade. The livestock loading chute may be fully extended behind the rear of the truck with the swing arms at their limit of rearward travel along the fourth travel path and the truck is placed in park while the driver extends both of the pair of posts down to the respective grade.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
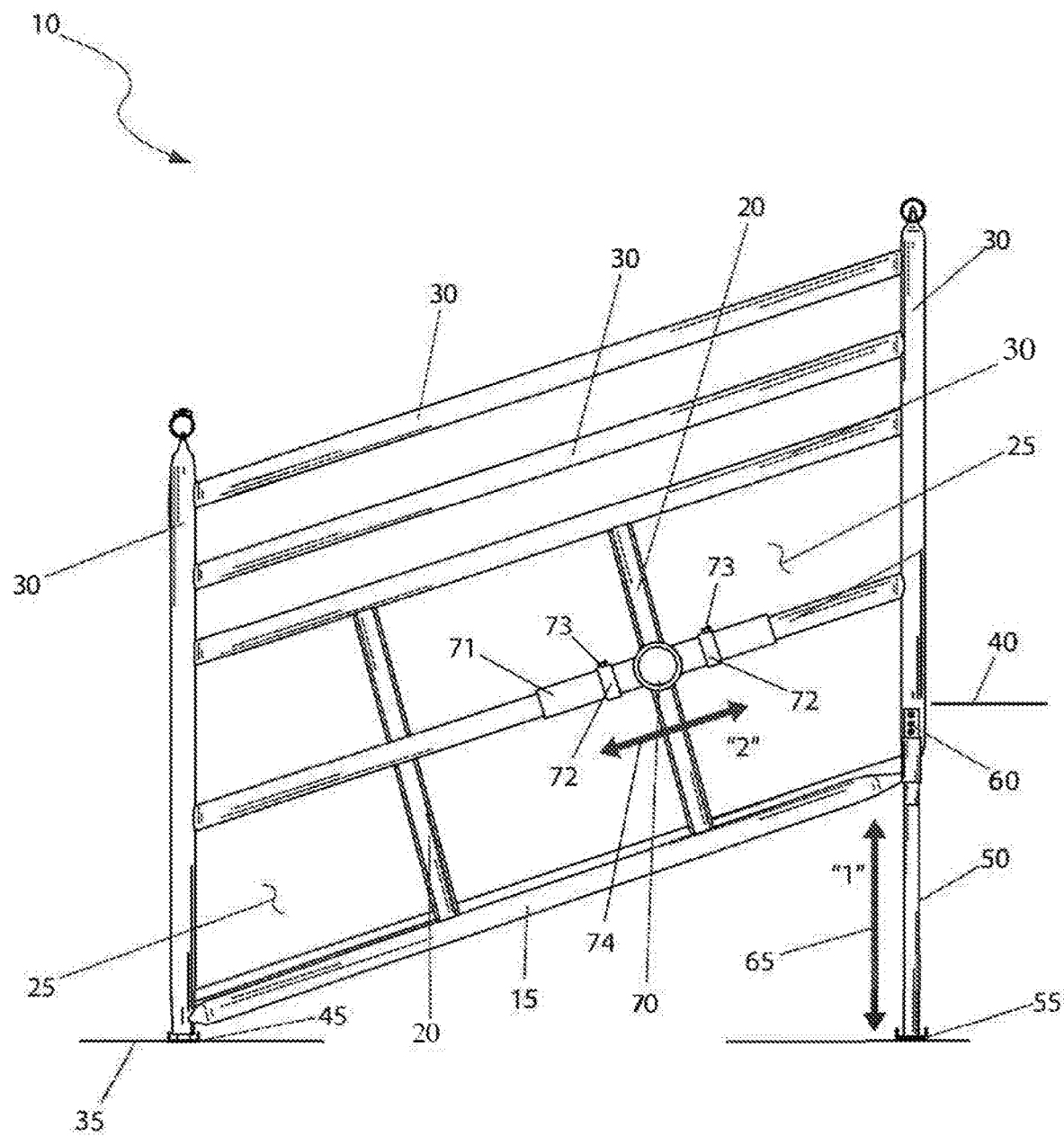
FIG. 1 is a side view of the livestock loading chute 10, according to the preferred embodiment of the present invention.

DESCRIPTIVE KEY 10 livestock loading chute
15 base frame
20 lower side frame
25 panels
30 upper side frame
35 lower elevation
40 upper elevation
45 bearing plate
50 post
55 base plate
60 locking slide collar
65 first travel path "1"
70 pin sleeve
71 adjustment bar
72 restraining bracket
73 first locking pin
74 second travel path "2"
75 load bearing walking surface
80 traction aid
81 second locking pin
82 removal travel path "r"
85 cross member
90 bale bed assembly
95 pickup truck
100 pin head
105 swing arm
110 third travel path "3"
115 grade
120 fourth travel path "4"

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a side view of the livestock loading chute 10, according to the preferred embodiment of the present invention is disclosed. The livestock loading chute 10 (herein also described as the "device") 10, includes a base frame 15 that forms the walking surface for the livestock. A pair of lower side frames 20 (two (2) total, only one (1) visible due to illustrative limitations) each of which is mechanically connected to the base frame 15. A set of panels 25, each envisioned to be made of galvanized sheet steel are attached to inside surfaces of the lower side frames 20 to prevent livestock from exiting the device 10 through the members of the lower side frame(s) 20. A pair of upper side frames 30 (two (2) total, only one (1) visible due to illustrative limitations) each of which is provided atop the lower side frames 20. The upper side frames 30 are not provided with panels 25 to allow for viewing of the livestock as they pass through the device 10.

The device 10 provides for access from a lower elevation 35, such as grade, to an upper elevation 40, such as a transport trailer or truck. The base frame 15 is supported on the lower elevation 35 by bearing plates 45 (two (2) total, only one (1) visible due to illustrative limitations, each attached to the base frames 15. The device 10 is supported at the upper elevation 40 by posts 50 (two (2) total, only one (1) visible due to illustrative limitations), each equipped with a base plate 55 (two (2) total, only one (1) visible due to illustrative limitations). Each base plate 55 is restrained by a locking slide collar 60, which uses an adjustment mechanism such as bolt, pin with cotter pin, spring pin or the like to allow for the posts 50 to adjust and lock at different heights along a first travel path "1" 65. As such, the posts 50 allows for height adjustment of the upper elevation 40 from a flat position all the way to an upper position for the highest of truck loading, as well as any point in between.

A pair of pin sleeves 70 accepts the pin from a bale bed loading mechanism on a truck to allow for movement of the device 10. The pin sleeves 70 are mounted on an adjustment bar 71 subsequently restrained by two (2) restraining brackets 72 and locked in position by two (2) first locking pins 73. This adjustment provided by the adjustment bar 71 allows for movement of the pin sleeves 71 along a second travel path "2" 74, envisioned to compensate for different sized pickup trucks 95, different grade 115 and other external factors. The assembly afforded by the pin sleeves 70, the adjustment bar 71, the two (2) restraining brackets 72, and the two (2) first locking pins 73 are duplicated on the opposite side of the device 10. Further description of the movement action will be provided herein below. It is envisioned that the base frame 15, the lower side frames 20, the upper side frames 30, the bearing plates 45, the posts 50, the base plates 55, the locking slide collars 60, the pin sleeves 70, the adjustment bar 71, the two (2) restraining brackets 72, and the two (2) first locking pins 73 would be made of carbon steel stock shapes that are cut to size and welded together. However, other materials such as aluminum, stainless, steel, or the like may be substituted for one or all components. The material of construction, as well as the overall size and configuration of the device 10 is not intended to be a limiting factor of the present invention.

Figure 2:
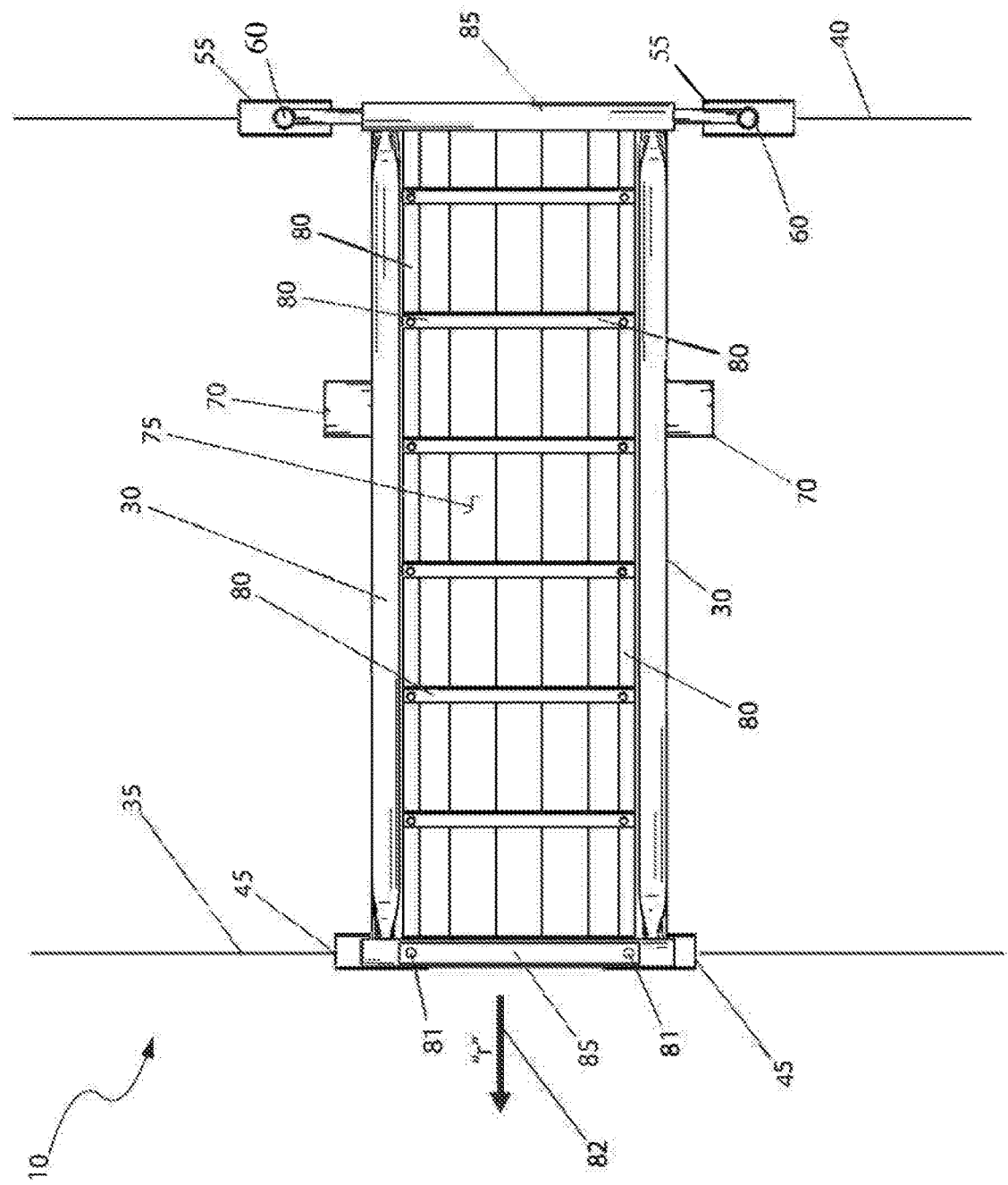
FIG. 2 is a top view of the livestock loading chute 10, according to the preferred embodiment of the present invention.

Referring next to FIG. 2, a top view of the device 10, according to the preferred embodiment of the present invention is depicted. This view provides additional clarification of the upper side frames 30 sitting atop the lower side frames 20 (not visible in this figure due to illustrative limitations). A load bearing walking surface 75, such as an assembly of wooden planks, are provided atop the base frame 15 (not visible in this figure due to illustrative limitations). Traction aids 80 such as wooden cleats, metal bars, a grid or the like, may or may not be provided atop the load bearing walking surface 75. It is also envisioned that the traction aids 80 may be removable such that it may be added when needed. Removal of the traction aids 80 would be accomplished by removal of two (2) second locking pins 81 and pulling the traction aids 80 outward along a removal travel path "r" 82. The two (2) bearing plates 45 are visible at the lower elevation 35. The upper elevation 40 is supported by the base plates 55, the posts 50, and the locking slide collars 60, as aforementioned described. A set of two (2) cross members 85 connect the upper portion of the upper side frames 30 and provide structural stability for the device 10. The two (2) pin sleeves 70 extend outward from the upper side frames 30 in an inline arrangement.

Figure 3:
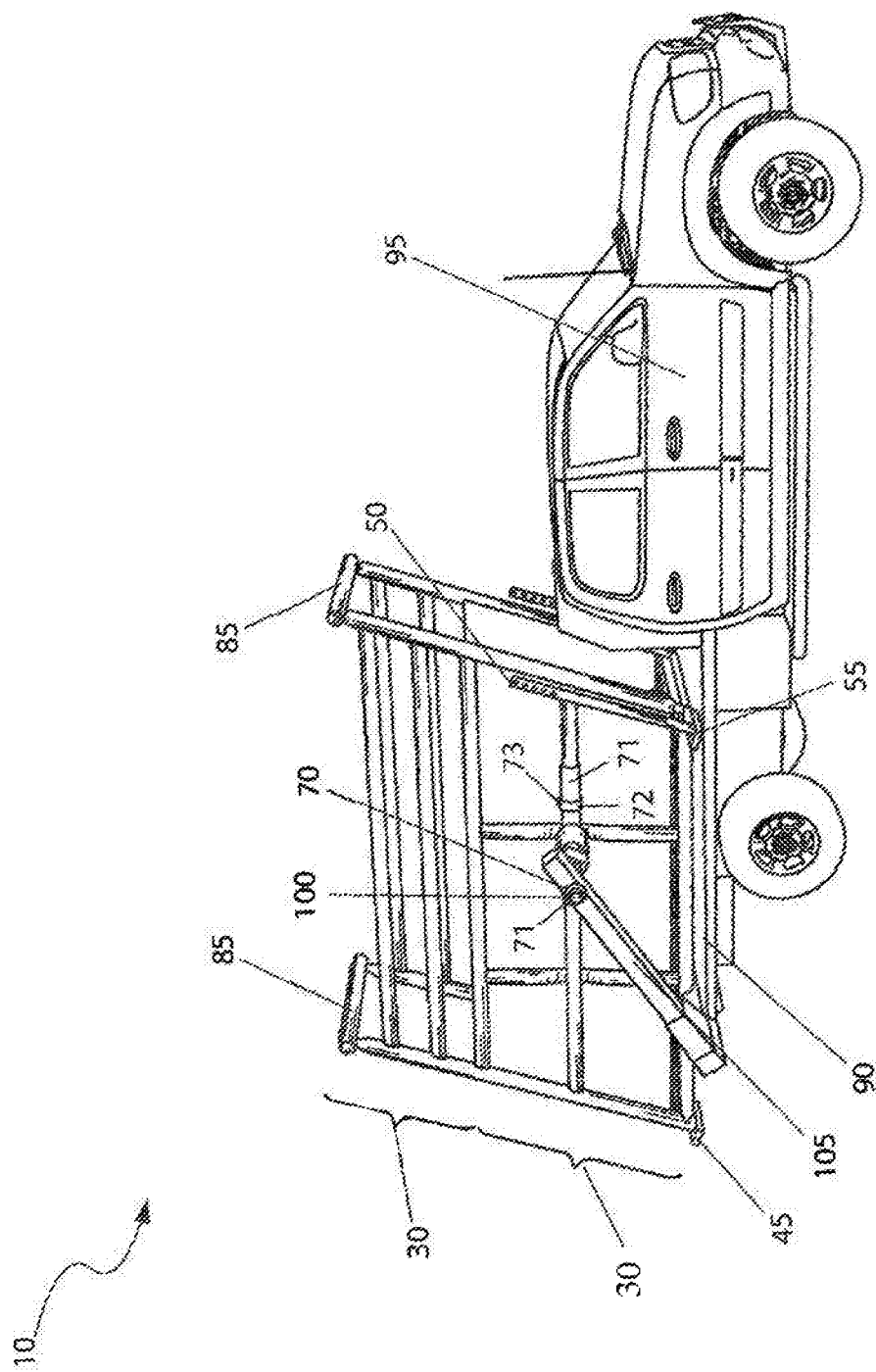
FIG. 3 is a perspective view of the livestock loading chute 10, shown in a stowed state, according to the preferred embodiment of the present invention.

Referring now to FIG. 3, a perspective view of the device 10, shown in a stowed state, according to the preferred embodiment of the present invention is shown. The device 10 is shown atop a bale bed assembly 90 as mounted to a pickup truck 95. The bale bed assembly 90 and the pickup truck 95 are of conventional, common design and operate in a customary manner. The configuration and operation of the bale bed assembly 90 and the pickup truck 95 are not contingent on the usage of the device 10 and are not within the scope of the present invention. The perspective view afforded by FIG. 3 provide further clarification of the cross members 85 and their utilization in stabilizing the upper side frames 30 and the lower side frames 20. The posts 50 are fully retracted into the locking slide collars 60, with the base plates 55 resting upon the bed surface of the bale bed assembly 90. The bearing plates 45 are at the same horizontal plane of the bed surface of the bale bed assembly 90. The pin sleeves 70 of the device 10 are each engaged by a pin head 100 in the same manner that a pin heads 100 would engage a round bale of hay. In the position as shown in FIG. 3, the device 10 may be transported from one (1) location to another confident that the device 10 is sufficiently anchored and will remain in position.

Figure 4:
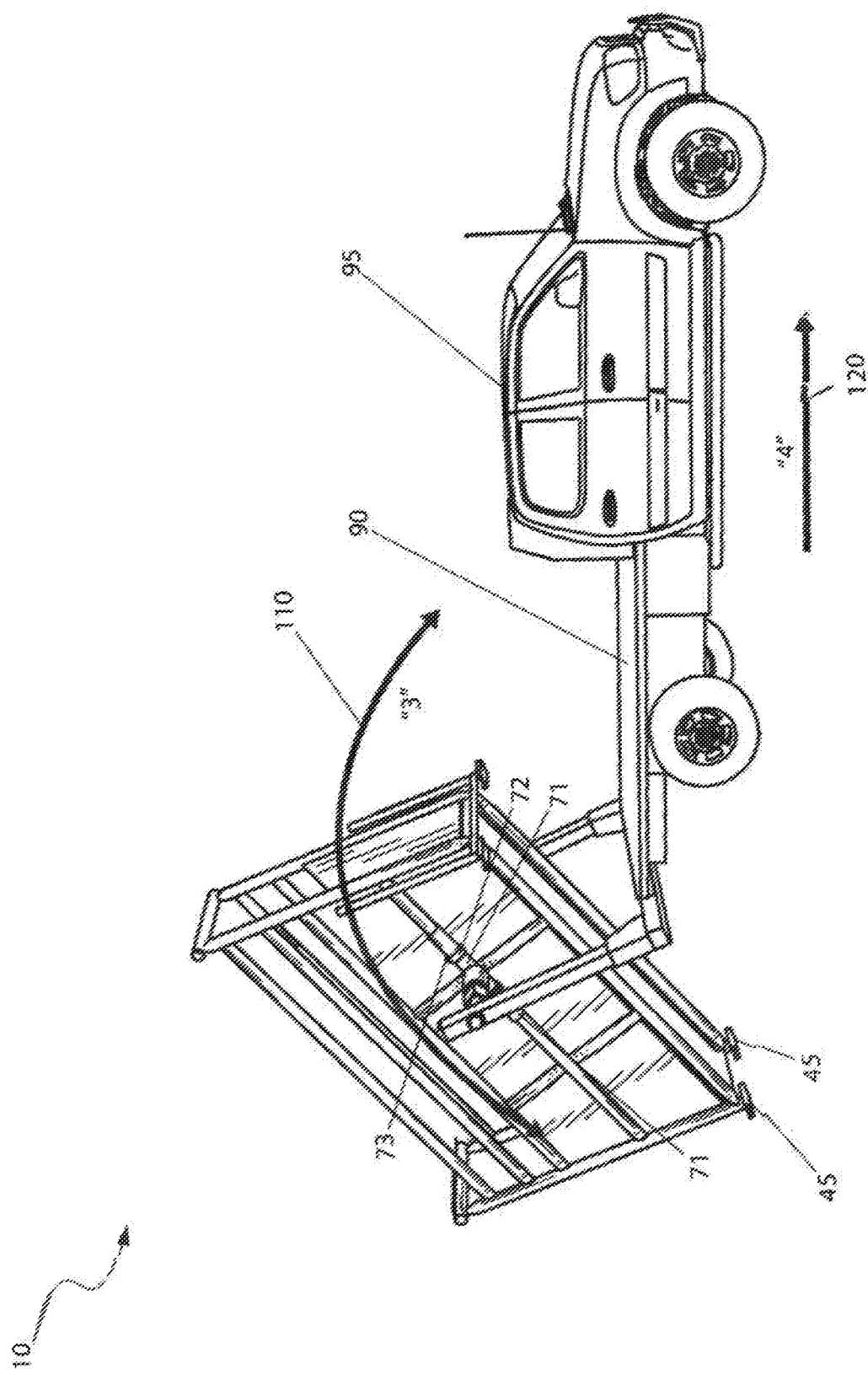
FIG. 4 is a perspective view of the livestock loading chute 10, shown in a state of being deployed, according to the preferred embodiment of the present invention; and, FIG. 5 is a perspective view of the livestock loading chute 10, shown in a deployed state, according to the preferred embodiment of the present invention.

Referring next to FIG. 4, a perspective view of the device 10, shown in a state of being deployed, according to the preferred embodiment of the present invention is disclosed. This view would be experienced during the loading and unloading process of the device 10 to and from the bale bed assembly 90 on the pickup truck 95. Using controls of the bale bed assembly 90, the swing arms 105 on the bale bed assembly 90 are pivoted about third travel path "3" 110. The pin heads 100 remain engaged with the pin sleeves 70 along the third travel path "3" 110 until the bearing plates 45 contact grade 115. At this point in time, the pickup truck 95 pulls forward along a fourth travel path "4" 120 until the swing arms 105 are fully rearwardly pivoted or extended. This process is reversed when picking up the device 10 and loading it onto the bale bed assembly 90.

Figure 5:
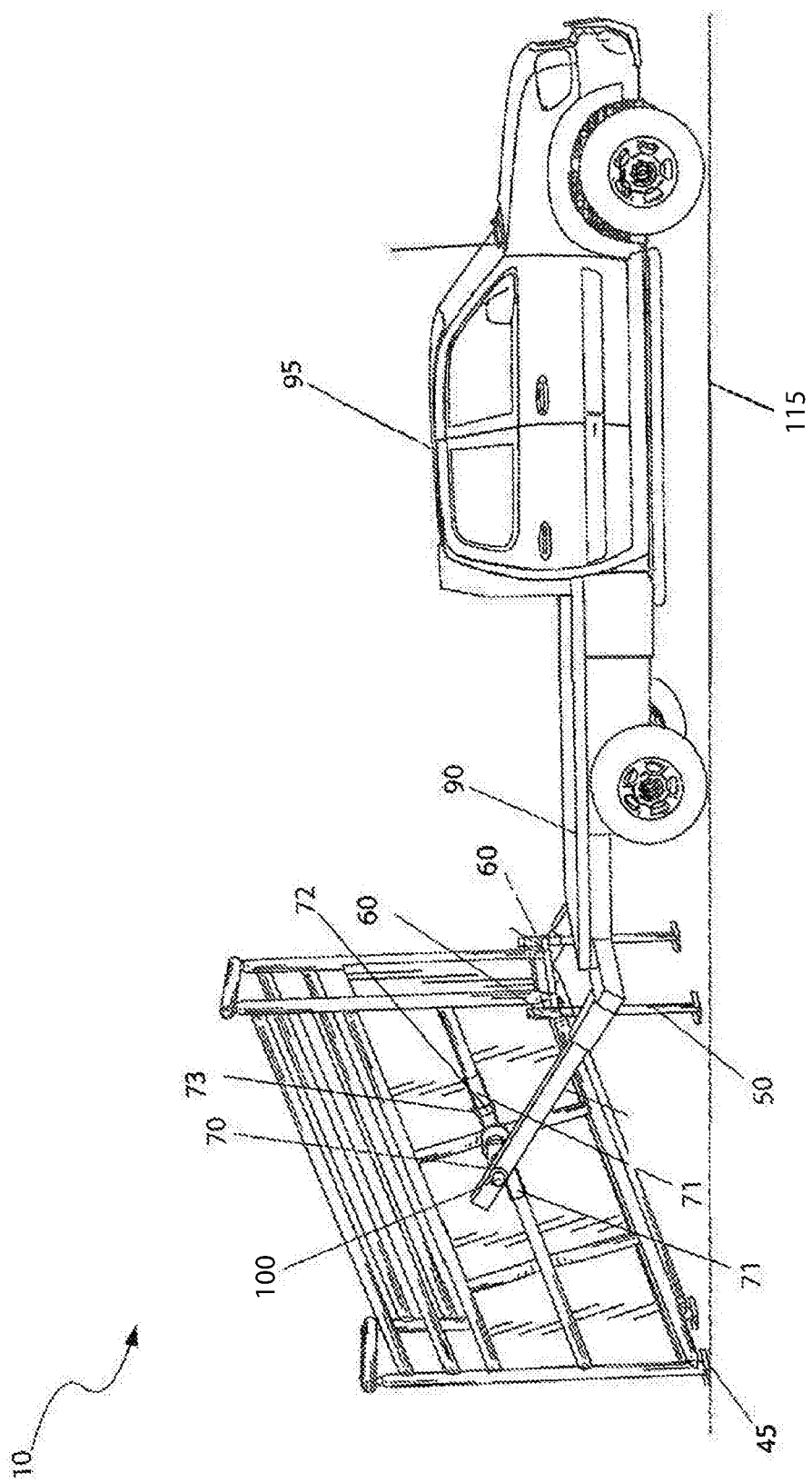

Referring to FIG. 5, a perspective view of the device 10, shown in a deployed state, according to the preferred embodiment of the present invention is depicted. With the device 10 fully extended behind the rear of the pickup truck 95 with the swing arms 105 at their limit of rearward travel along the fourth travel path "4" 120 (as shown in FIG. 4), the pickup truck 95 is placed in park while the driver extends both post(s) 50 down to grade 115. The posts 50 are locked in place in both locking slide collars 60. The fourth travel path "4" 120 is then moved outward using controls of the bale bed assembly 90 until the pin heads 100 are clear of the pin sleeves 70. At this point in time, the pickup truck 95 is driven away, leaving the device 10 in a ready to utilize position. The process to pick up and stow the device 10 is accomplished by reversal of the above process.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 5. The user would procure the device 10 from conventional procurement channels such as farm machinery suppliers, farm supply houses, mechanical equipment manufacturers, mail order and internet supply houses and the like. Special attention would be paid to overall size of the device 10, materials of construction, accessories, and the like.

After procurement and prior to utilization, the device 10 would be prepared in the following manner: the traction aids 80 may or may not be installed as shown in FIG. 2; the posts 50 would be extended (as shown in FIG. 1); the pickup truck 95, with the swing arms 105 of the bale bed assembly 90 fully extended (as shown in FIG. 5) will be backed up to a position corresponding to that shown in FIG. 5; the controls of the bale bed assembly 90 will be operated until both pin heads 100 engage their corresponding pin sleeves 70; the swing arms 105 are raised, or the pickup truck 95 is backed up slightly to lift the end of the device 10 corresponding to the upper elevation 40, off of the ground; the posts 50 are fully retracted into the locking slide collars 60; the pickup truck 95 is then backed up and the controls of the swing arms 105 operated until the base frame 15 of the device 10 rests fully on the bale bed assembly 90. At this point in time the device 10 may be transported to another location.

Upon arrival at the desired location for deployment, the controls of the bale bed assembly 90 are manipulated such that the swing arms 105 on the bale bed assembly 90 are pivoted about the third travel path "3" 110. The pin heads 100 remain engaged with the pin sleeves 70 along the third travel path "3" 110 until the bearing plates 45 contacts grade 115; the pickup truck 95 pulls forward along a fourth travel path "4" 120 until the swing arms 105 are fully rearwardly pivoted or extended; the pickup truck 95 is placed in park while the driver extends both posts 50 down to grade 115 and locked in place utilizing the locking slide collars 60; the fourth travel path "4" 120 are then moved outward using controls of the bale bed assembly 90 until the pin heads 100 are clear of the pin sleeves 70. At this point in time, the pickup truck 95 is driven away, leaving the device 10 in a ready to utilize position.

The above process is reversed as needed to pickup and move the device 10 to another location allowing for continual re-use of the device 10 in a cyclical manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A livestock loading chute, comprising:
a base frame forming a walking surface for a plurality of livestock, the base frame is supported on a lower elevation by a plurality of bearing plates each attached to the base frame;
a pair of lower side frames each mechanically connected to the base frame;
a pair of panels each attached to an inside surface of the pair of lower side frames to prevent the livestock from exiting the livestock loading chute through the pair of lower side frames;
a pair of upper side frames each provided atop the pair of lower side frames;
a pair of sleeves accepting an adjustment mechanism from a bale bed loading mechanism on a truck to allow for movement of the livestock loading chute, the sleeves are mounted on an adjustment bar restrained by a pair of restraining brackets and locked in position by a pair of first locking pins;
a load bearing walking surface provided atop the base frame;
a pair of cross members connecting the upper portion of the upper side frames that provide structural stability for the livestock loading chute;
a bale bed assembly mounted to the truck;
a pair of posts fully retracted into a pair of locking slide collars with a plurality of base plates resting upon a bed surface of the bale bed assembly and the bearing plates are at a same horizontal plane of the bed surface of the bale bed assembly; and
a plurality of traction aids provided atop the load bearing walking surface;
wherein the livestock loading chute provides access from the lower elevation to an upper elevation;
wherein the adjustment bar allows for movement of the sleeves along a second travel path to compensate for a plurality of different sized trucks, a plurality of different grades, and one or more other external factors;
wherein the pair of sleeves are each engaged by a pin head;
wherein the truck is configured to pull forward along a fourth travel path until a plurality of swing arms are fully rearwardly pivoted or extended and the truck is configured to pull backward along the fourth travel path until the swing arms are fully rearwardly pivoted or extended; and
wherein the bale bed assembly, the swing arms on the bale bed assembly are pivoted about a third travel path while the pin heads remain engaged with the pair of sleeves along the third travel path until the bearing plates contact a respective grade.

2. The livestock loading chute according to claim 1, wherein the lower elevation is a grade.

3. The livestock loading chute according to claim 1, wherein the upper elevation is a transport trailer.

4. The livestock loading chute according to claim 1, wherein the upper elevation is the truck.

5. The livestock loading chute according to claim 1, wherein the livestock loading chute is supported at the upper elevation by the pair of posts each equipped with the base plates.

6. The livestock loading chute according to claim 5, wherein each of the base plates are restrained by one of the pair of locking slide collars, which uses the adjustment mechanism to allow for the pair of posts to adjust and lock at different heights along a first travel path to allow for height adjustment of the upper elevation.

7. The livestock loading chute according to claim 1, wherein the pair of panels are made of galvanized sheet steel.

8. The livestock loading chute according to claim 1, wherein the pair of first locking pins are made of material selected from the group consisting of carbon steel stock shapes that are cut to size and welded together, aluminum, stainless steel, or steel.

9. The livestock loading chute according to claim 1, wherein the pair of sleeves extend outward from the upper side frames in an inline arrangement.

10. The livestock loading chute according to claim 1, wherein the load bearing walking surface is an assembly of wooden planks.

11. The livestock loading chute according to claim 1, wherein the traction aids are a plurality of aids selected from the group consisting of a plurality of wooden cleats, a plurality of metal bars, or a grid.

12. The livestock loading chute according to claim 1, wherein the traction aids are configured to be removed by removal of a pair of second locking pins and pulling the traction aids outward along a removal travel path.

13. The livestock loading chute according to claim 1, wherein the livestock loading chute is fully extended behind the rear of the truck with the swing arms at their limit of rearward travel along the fourth travel path and the truck is placed in park the truck is configured to extend both of the pair of posts down to the respective grade.

* * * * *